United States Patent [19] [11] 3,877,557
Maucher [45] Apr. 15, 1975

[54] CLUTCH BEARING HAVING RADIAL AND AXIAL FREE PLAY

[75] Inventor: Paul Maucher, Sasbach, Germany

[73] Assignee: Luk Lamellen Und Kupplungsbay GmbH, Buhl, Germany

[22] Filed: Jan. 8, 1974

[21] Appl. No.: 431,662

Related U.S. Application Data

[63] Continuation of Ser. No. 157,436, June 28, 1971, abandoned.

[30] Foreign Application Priority Data

June 26, 1970 Luxembourg............................ 61202

[52] U.S. Cl. ................................................. 192/98
[51] Int. Cl. ............................................. F16d 23/14
[58] Field of Search ........................... 192/98, 110 B

[56] References Cited
UNITED STATES PATENTS 1,606,127   11/1926   Kolb ........................................ 192/98
2,359,364   10/1944   Katcher .................................. 192/98
3,317,014    5/1967   Pitner ..................................... 192/98
3,333,664    8/1967   Chapaitis ................................ 192/98
3,413,637   12/1968   Maurice .................................. 192/98
3,604,545    9/1969   Bourgeois ............................... 192/98
3,640,364    2/1972   Utton ...................................... 192/98

Primary Examiner—Benjamin W. Wyche
Attorney, Agent, or Firm—Herbert L. Lerner

[57] ABSTRACT

Disengaging member for a clutch or the like includes a sliding sleeve formed with a bore, a bearing mounted on the sliding sleeve and including a revolving race and a non-revolving race, stop means for limiting axial movement of the non-revolving race with respect to the sliding sleeve, the revolving race having contact surfaces for engagement by disengaging elements of a clutch, and retaining means effective in axial direction of the sliding sleeve for ensuring retention of the bearing on the sliding sleeve, the bearing having free play both in radial and axial directions with respect to the sliding sleeve.

18 Claims, 12 Drawing Figures

Inventor:

CLUTCH BEARING HAVING RADIAL AND AXIAL FREE PLAY

This is a continuation, of application Ser. No. 157,436, filed June 28, 1971, and now abandoned.

The invention relates to disengaging member, especially for clutches wherein a bearing, such as a roller-type bearing, for example, is mounted on a sliding sleeve formed with a bore through which a guide tube is extensible, there being radial play between the bearing and the sliding sleeve. The sliding sleeve of such disengaging member is provided with stop means for limiting axial movement of the non-revolving race, the revolving race having contact surfaces for engagement by disengaging elements of a clutch or the like. Such disengaging members are also provided with retaining or locking means which are active in axial direction of the sliding sleeve for ensuring retention of the bearing on the sliding sleeve.

With the aid of disengaging members of the type disclosed, for example, in the German published application DOS No. 1 600 080, the offset of the center-line or axis of the disengaging elements of a clutch such as, for example, plate spring tongues, levers, compression members and the like, and of a central guide tube on which the disengaging member is mounted, is sought to be adjusted or balanced, because such a center-line or axis offset of these parts with respect to one another cannot be avoided in paractice during assembly of the tranmission at the motor.

In disengaging members according to the aforementioned German published application, the non-revolving ring or race of the bearing, which is mounted on a sliding sleeve with radial play relative to the sliding sleeve, is biased by a plate spring in axial direction against a friction ring that is secured on the sliding sleeve against displacement in axial direction.

The adjustment of the offset between the center lines or axes of the disengaging member and the clutch disengaging elements occurs the moment the revolving race of the bearing is brought into contact with the disengaging elements of the clutch, the bearing being placed in a position in which it is concentric or its axis is coaxial with the axis of revolution of the clutch disengaging elements due to the dynamic influences exerted by the disengaging elements.

Disengaging members of this known type, have a disadvantage, however, in that the resistance, which opposes the centering of the axes and which is a function of the friction force that is produced by the forces exerted at the friction ring through the disengaging elements and is increased still further by the biasing force of the plate spring, assumes an extremely high value. Consequently, rubbing or scrubbing of the revolving bearing ring against the clutch disengaging elements occurs over a relatively long period of time until the centering of the axes takes place, resulting in considerable wear of the parts rubbing against one another.

Furthermore, such heretofore known disengaging members have a disadvantage in that a relatively large number of components and corresponding holders for these components are required, thereby resulting in relatively high manufacturing costs both with respect to time and material. In addition, the components must be machined within very narrow tolerances which requires a number of control devices that cannot, however, avoid a relatively high reject count in the production thereof.

It is accordingly an object of the invention to provide disengaging member which avoids the aforementioned disadvantages of the heretofore known disengaging members of this general type. More specifically, it is an object of the invention to provide disengaging member which will afford a better and more rapid centering thereof with the disengaging elements of a clutch and thereby reduce wear of the disengaging member bearing and the clutch disengaging elements.

A further object of the invention is to provide disengaging member which may be produced more simply than the heretofore known disengaging members, by having a lesser number of components by dispensing with the necessity for great dimensional accuracy, and by accordingly reducing the work necessary for the assembly of the components.

With the foregoing and other objects in view, there is provided in accordance with the invention, disengaging member for a clutch or the like comprising a sliding sleeve formed with a bore, a bearing mounted on the sliding sleeve and including a revolving race and a non-revolving race, stop means for limiting axial movement of the non-revolving race with respect to the sliding sleeve, the revolving race having contact surfaces for engagement by disengaging elements of a clutch, and retaining means effective in axial direction of the sliding sleeve for ensuring retention of the bearing on the sliding sleeve, the bearing having free play both in radial and axial directions with respect to the sliding sleeve.

More specifically, in accordance with the invention, there is provided disengaging member which, with the omission of spring or clamping members for biasing the bearing against the stop means, affords free play of the bearing both in axial and radial direction with respect to the sliding sleeve and also with respect to the retaining means.

In accordance with another feature of the invention, the retaining means are either located at the sliding sleeve within the radial extension of the bearing, for example by being articulatingly connected, fastened or otherwise secured thereto, or are, for example, articulatingly connected, fastened. clamped or the like to the retaining means which are provided at one of the bearing races or rings, or both.

By means of this jam-free play of the bearing with respect to the sliding sleeve, a significantly easier and more rapid centering of the axis of the disengaging member of the invention and of the clutch disengaging elements is afforded because, through this mounting support of the bearing, the resistance which opposes the centering, is made up solely of the friction of the non-revolving bearing race on the axially fixed attachment member of the sliding sleeve such as, for example, a flange. This produces a markedly reduced wear on the one bearing ring abutting the clutch disengaging elements as well as the wear on the clutch disengaging elements proper. By the use of a reduced number of components, the disengaging member of the invention is more economically priced, the production thereof is simplified and, furthermore, the production and assembly thereof with a greater range of tolerances are rendered possible.

In accordance with additional features of the invention, there is provided a disengaging member in which both radial as well as axial roller bearings are employed and, in various embodiments, actually conventional ball bearings may be employed.

As aforementioned, these advantages are attained by the fact that the bearing is capable of free play on the sliding sleeve both in axial as well as radial direction with respect to the locking or retaining means which are connected to the sliding sleeve with the radial extension of the bearing and/or by the fact that the bearing together with the locking or retaining means, which are connected to one of the bearing rings, has free play both in axial and radial directions on the sliding sleeve.

In accordance with another feature of the invention, the retaining or locking means is articulatingly connected to the sliding sleeve.

In accordance with yet another feature of the invention, the sliding sleeve is formed at least partly of a sheet metal member having a radially outwardly extending attachment part for a clutch actuating means, such as for example, a disengaging fork or the like, a radially outwardly extending abutment part forming the stop means for one of the bearing rings, namely the non-revolving race at which a carrier or support member for the bearing which surrounds the bearing with radial spacing, is connected, and furthermore, a radially outwardly extending part serving as the retaining or locking means.

In accordance with a concomitant feature of the invention, the sliding sleeve is in the form of a complete sheet metal profile member, the radially outwardly extending attachment part for the clutch disengaging device being flanged and being abuttable on the other side thereof by one of the bearing races. The radially outwardly extending part serving as the retaining or locking means for the bearing is formed as a flange part or has individual, claw-like flanges.

In accordance with other features of the invention, the one bearing race, namely the non-revolving race, in such disengaging member formed at least partly of sheet metal, is constructed by a seam-like embossment, a radial, step-like projection or the like.

In accordance with yet additional features of the invention, the retaining or locking means are formed by snap rings, spring washers or the like which are retained or fixed on the sliding sleeve in a groove, a furrow, flange, embossment or the like formed within the sliding sleeve.

In accordance with yet additional features of the invention, the retaining or locking means is constructed and/or disposed so that the bearing is secured by the retaining means directly over an end contour of the bearing race thereof. On the other hand, the opposing contours of the bearing operatively associated with the locking or securing means is formed of a groove, furrow, undercut, chamfer or the like in the bearing, and the axial play is produced through a corresponding wide formation of the groove, furrow, etc. or the like.

It is furthermore possible in accordance with the invention to build in the locking means per se within the sliding sleeve so that it has play in axial and radial directions with respect to the sliding sleeve. Further advantageous embodiments of the disengaging member of the invention are produced when the retaining or locking means is ariculatingly connected to one of the bearing rings or races. In this regard, in accordance with the invention, snap rings, spring washers or the like, which are retained in a groove, furrow or the like, formed in one of the bearing rings are simultaneously received in a groove, furrow or the like formed in the sliding sleeve, at the location thereof at which the bearing surrounds the sliding sleeve. The groove, furrow or the like formed in the sliding sleeve has a greater elongation in axial direction than the effective range of the retaining or locking means. In this regard, it is not absolutely necessary in all cases that the snap ring, spring washer or the like, connected to one of the bearing races should be fixed both in axial as well as radial directions in the bearing race, but rather the retaining or locking means can also have play in the corresponding bearing race.

In accordance with another feature of the invention, the retaining or locking means is provided in a groove, furrow or the like in one of the recesses, for example, in the outer race or a radial bearing wherein this outer bearing race overlaps the abutment profile of the other ring, namely the inner ring, with given spacing, and the snap ring extends radially inwardly for such a distance as to produce locking in axial direction of the sliding sleeve.

In accordance with a further feature of the invention, the retaining or locking means is formed of at least one member which is rigidly connected with one of the bearing recesses and which overlaps the cage-like part of the sliding sleeve. A disengaging member constructed in such manner, in accordance with the invention, is provided with a cage-like sheet metal sleeve having two radially inwardly directed portions of which one is received in a groove formed with one of the bearing recesses and wherein the other radially inwardly directed member of this cagelike component at least partly overlaps part of a radial extension of the sliding sleeve such as, for example, the attachment part for the clutch actuating means.

In accordance with a further feature of the invention, the retaining or locking means is constructed or disposed so that it serves not only for limiting play of the bearing in axial direction but also for limiting play of the bearing in radial direction.

The employment of the disengaging member of the invention is particularly advantageous in disengaging units used especially for motor trucks when, in accordance with an additional feature of the invention, the rotatably mounted part of the disengaging member, that is one of the bearing races abuts the disengaging elements also in the engaged condition of the clutch, because then the travel losses within the disengaging system are eliminated.

Independently of whether or not a mechanical, hydraulic or other means for actuating the clutch is provided, it is particularly advantageous when, in accordance with the invention, at least substantially over the play wearing path of the clutch part, the disengaging member is pressed against the disengaging elements of the clutch through a force-storing device acting on the disengaging member of the disengaging member actuating system.

Other features which are considered as characteristic for the invention are set forth in the appended claims.

Although the invention is illustrated and described herein as embodied in disengaging member, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
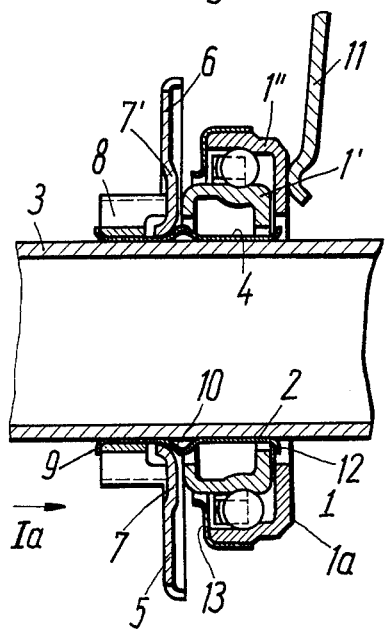
FIG. 1 is a longitudinal sectional view of a disengaging member according to the invention.
Figure 1A:
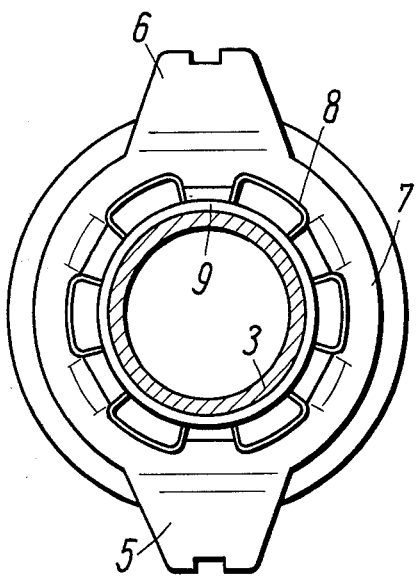
FIG. 1a is an end view partly in section of FIG. 1 as seen in the direction of the arrow Ia.

Referring now to the drawing and first, particularly to FIGS. 1 and 1a thereof, there is shown a centrally guided disengaging member constructed in accordance with the invention, which has a radial bearing 1 that is disposed on a sliding sleeve 4 formed with an opening 2 through which a guide tube 3 extends. The sliding sleeve 4 is a sheetmetal part. In addition, the disengaging member of the invention is provided with radially outwardly extending arms 5 and 6 for the actuating means of a clutch or the like, for example a disengaging fork. These arm-like attachment parts 5 and 6 are components of an annular member 7 which is pressed against an outwardly extending bead 10 formed on the sliding sleeve 4 by means of a wave-shaped sleeve 8 which is retained by a flanged edge 9 of the sliding sleeve 4. The disengaging member of the invention is furthermore provided with an abutment region 7' against which a non-revolving ring or race 1' of a ball bearing 1 is abuttable. A ring 1" of the ball bearing 1 revolves with schematically illustrated disengaging means, such as plate spring tongues 11, of a clutch, the ring 1" being provided with a contact region 1a with which the disengaging means 11 is engageable. As is especially apparent from FIG. 1, the ball bearing 1 affords jam-free play both in axial and radial directions with respect to the sliding sleeve 4, the play in radial direction being produced due to the difference in diameters of the sliding sleeve 4 and the inner bearing ring 1', and the play in axial direction being relative to locking or retaining means that are provided at the sliding sleeve 4, namely a flanged edge 12 of the sliding sleeve 4. The bearing is sealed by suitable conventional sealing means 13.

Figure 2:
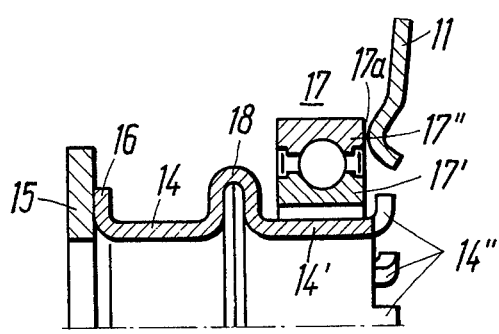
FIGS. 2 to 10 are half-sectional views of other embodiments of FIG. 1.

The embodiment of the disengaging member of the invention shown if FIG. 2 is formed of a shaped sheetmetal sleeve 14 having a flange 16 to which a radially outwardly extending annular attachment member 15 of a conventional clutch actuating device or the like, not further illustrated in the figure, is connected, for example by spot welding. In addition, a radially outwardly extending abutment region for the fixed ring or race 17' of the ball bearing 17 is provided in the form of a bead 18 on the sleeve 14. The revolving second ring or race 17" of the bearing 17 has contact surfaces 17a engageable by the clutch disengaging member 11. The bearing 17 surrounds a retaining region 14' of the sliding sleeve 14 which affords play in radial direction. Play of the bearing 17 in axial direction is afforded with respect to locking or retaining devices in the form of bent claws 14", for example, provided at or connected to the sliding sleeve 14.

Figure 3:
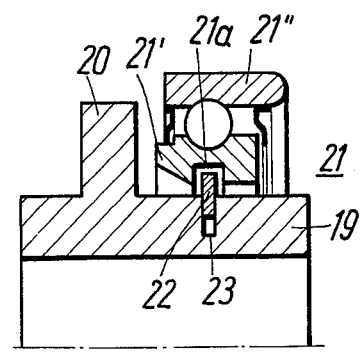

In the embodiment of FIG. 3, the sliding sleeve 19 of the disengaging member of the invention has a radially outwardly extending flange 20, which serves on the one hand, as abutment or stop member for the non-revolving bearing ring 21' and, on the other hand, as attachment member for a conventional clutch actuating device or the like, not further shown in the figure. The revolving ring 21" of the bearing 21 is constructed so that the revolving ring 21" cannot come into contact with the flange 20 when the non-revolving ring 21' abuts the flange 20. The locking device for the embodiment of FIG. 3 is formed by a snap ring or circlip 22 which is received in an annular groove 23 formed in the sliding sleeve 19. The opposing contours of the bearing 21 operatively associated with the snap ring 22 i.e. with the locking or retaining device, are formed by a groove 21a which permits axial play of the bearing 21. The groove 23 in the guide and sliding sleeve 19 is of such depth as to afford satisfactory and troublefree assembly.

Figure 4:
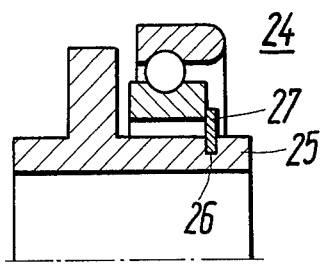

In FIG. 4 there is shown another embodiment of the disengaging member of the invention wherein play of the bearing 24 is permitted relative to a snap ring 27 connected to the sliding sleeve 25 and retained in an annular groove 26 formed therein.

Figure 5:
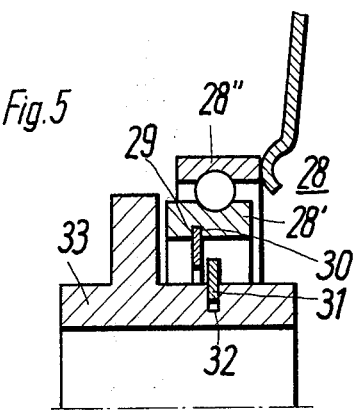

In the embodiment of FIG. 5, axial play of the bearing 28 is permitted by means of two locking or retaining members, one of which, namely a first snap ring 29, being retained in an annular groove 30 of the one bearing ring 28', and the other of which, namely a second snap ring 31, being secured in a groove 32 formed in the sliding sleeve 33.

Figure 6:
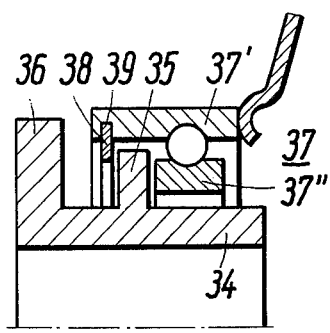

In the embodiment of the disengaging member of the invention shown in FIG. 6, the sliding sleeve 34 is provided with two radially outwardly directed portions or regions 35 and 36, one of which, namely the flange 36, serves as stop or abutment for the non-illustrated clutch actuating member or the like, and the other of which, namely the flange 35, is enclosed by the outer, revolving ring or race 37' of the ball bearing 37. The flange 35 acts as stop or abutment means for the non-revolving ring or race 37" of the bearing 37. The retainer or locking device for the embodiment of FIG. 6 is formed of a snap ring 38 which is received in an annular groove 39 formed in the outer ring 37'. Play in axial as well as radial direction is thereby afforded both to the bearing 37 as well as to the snap ring locking device 38.

Figure 7:
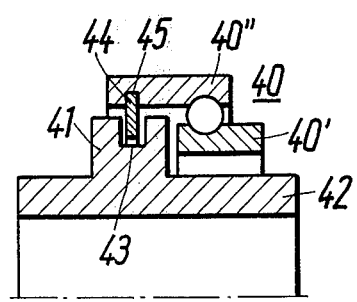

Play of the bearing 40 and the locking or retaining device 44 is also permitted in the embodiment of the disengaging member of the invention illustrated in FIG. 7. However, in contrast to the embodiment of FIG. 6, the radially inwardly disposed ring or race 40' of the bearing 40 of the embodiment of FIG. 7 is the revolving ring. An annular groove 43 is formed in a flange 41 of the sliding sleeve 42, a snap ring 44 or the like, having an inner diameter that is greater than the base diameter of the groove 43 and having a thickness smaller than the width of the groove 43, being received therein and also in an opposing annular groove 45 formed in the radially inner surface of the non-revolving outer ring or race 40" of the bearing 40. Especially in the case of this embodiment of FIG. 7, the snap ring 44, which functions as stop or abutment device with respect to axial play simultaneously serves for limiting play of the bearing 40 in radial direction.

Figure 8:
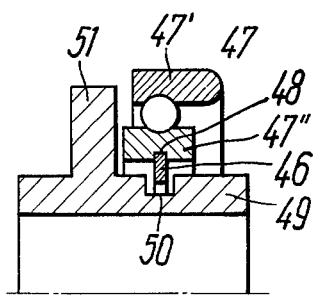

In FIG. 8, there is shown an embodiment of the disengaging member of the invention wherein a snap ring 46 is retained in an annular groove 48 formed in the radially inner surface of the inner ring or race 47" of a bearing 47. An annular groove 50 is also formed in the radially outer surface of a sliding sleeve 49 and is of such dimensions that play of the bearing 47 with the snap ring locking or retaining device 46 is afforded both in axial and radial directions. The sliding sleeve 49 is provided with a radially outwardly extending flange 51 which serves as stop or abutment for the inner non-revolving ring 47" of the bearing 47, the outer and revolving ring 47' thereof being of such construction that it does not come into contact with the flange 51.

Figure 9:
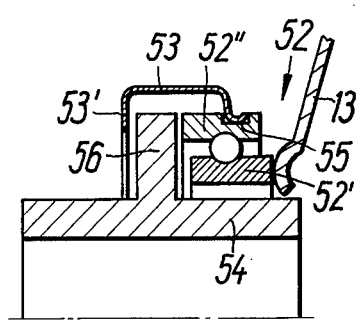

In the embodiment of FIG. 9, the bearing 52 is provided with a cage-like retaining or locking member 53 which permits play thereof and of the bearing 52 both in axial and radial directions with respect to the sliding sleeve 54. The cage-like component 53 has, on the one hand, a portion thereof that is firmly received in an annular groove 55 formed in the outer peripheral surface of the outer, non-revolving bearing ring or race 52", and has, on the other hand, a radially inwardly directed flange edge 53' which encloses a flange 56 extending from the sliding sleeve 54. The flanged edge 53' can also, however, extend into an annular groove, flute or the like, which may be formed for example in a radial extension of the sliding sleeve 54 adjacent to and much like the flange 56 thereof. The revolving inner bearing ring or race 52' is so constructed that when the outer, non-revolving ring 52" of the bearing 52 comes into contact with the stationary flange 56 of the sliding sleeve 54, the revolving inner ring 52' will remain spaced from the flange 56.

Figure 10:
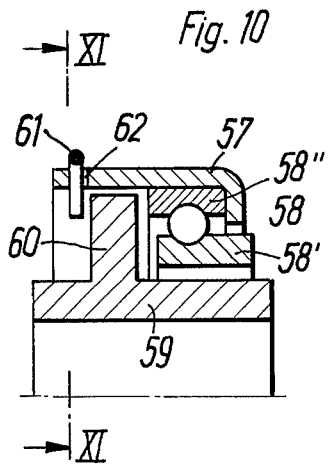
Figure 11:
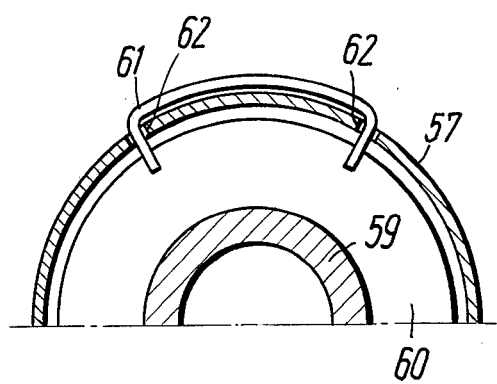
FIG. 11 is a cross sectional view of FIG. 10 taken along the line XI-XI in the direction of the arrows.

In FIGS. 10 and 11, yet another embodiment of the disengaging member of the invention is illustrated. As shown in these figures, a ball bearing 58 is provided having an outer, non-rotating ring or race 58" which is retained by a cagelike component 57 of sheet metal constructed as a holder member. The cagelike component 57 is radially spaced from and overlaps a flange 60 extending radially outwardly from the sliding sleeve 59. Hook-like clamps 61 are inserted, as locking devices, into suitably provided openings 62 formed in the cage-like holder member 57.

As noted hereinbefore, the invention of this application is not limited to the aforedescribed and illustrated embodiments. Thus, other means may be employed as locking and retaining devices than those noted hereinbefore and shown in the figures. In particular, snap rings need not necessarily be employed but rather, spring washers and snap members or locking members of other materials than steel can be used, such as plastic material, rubber or the like. Furthermore, the invention of the instant application is not limited to mechanically actuated disengaging members but rather also extends to disengaging members actuated by compression devices wherein the bearing is disposed with play on a ring piston or the like, in accordance with the inventive concept disclosed in this application.

The use of the novel and inventive disengaging member of this application in disengaging or clutch releasing units, especially for motor trucks, is particularly advantageous if the accompanying or following ring of the bearing also firmly engages the disengaging member of the clutch in the clutched or engaged condition of the clutch, because the travel losses existing in the disengaging system are then eliminated. In this regard, a force-storing device can be connected to the disengaging member proper or to the disengaging member actuating system so that the revolving bearing ring or race remains in continuous engagement with the disengaging member of the clutch, that is, for example, with the tongues of the plate spring, with the levers of the clutch or with a pressure plate or the like provided at the disengaging member.

I claim:

1. Disengaging member for a clutch or the like comprising a sliding sleeve formed with a bore, a bearing mounted on said sliding sleeve and including a revolving race and a non-revolving race, stop means for limiting axial movement of said non-revolving race with respect to said sliding sleeve, said revolving race having contact surfaces for engagement by radially extending disengaging elements of a clutch, and retaining means effective in axial direction of said sliding sleeve for ensuring retention of said bearing on said sliding sleeve, said retaining means being disposed in a position relative to said stop means to provide axial and unbiased free play of said bearing on said sliding sleeve, and said bearing having an inner race having a diameter greater than at least a portion of said sliding sleeve to provide radial free play of said bearing on said sliding sleeve.

2. Disengaging member according to claim 1 wherein said bearing also has free play both in radial and axial directions with respect to said retaining means.

3. Disengaging member according to claim 1 wherein said retaining means and said bearing have free play both in radial and axial directions with respect to said sliding sleeve.

4. Disengaging member according to claim 1 wherein said retaining means is secured to said sliding sleeve.

5. Disengaging member according to claim 4 wherein said sliding sleeve is at least partly formed of a sheet metal member having a radially outwardly extending attachment part for the clutch disengaging device, a radially outwardly extending abutment part forming said stop means for one of the races of said bearing.

6. Disengaging member according to claim 1 wherein said sliding sleeve is formed with a recess wherein said retaining means is received.

7. Disengaging member according to claim 1 wherein said sliding sleeve is formed with a flange engageable by said retaining means.

8. Disengaging member according to claim 1 wherein said bearing has opposing contours operatively associated with said retaining means, said opposing contours being formed by a recess provided in said bearing.

9. Disengaging member according to claim 1 wherein said bearing has opposing contours operatively associated with said retaining means, said opposing contours being formed by a chamber provided on said bearing.

10. Disengaging member according to claim 1 wherein said retaining means is connected to one of said bearing races.

11. Disengaging member according to claim 10 wherein said retaining means connected to said one bearing race is simultaneously received in a recess formed in said sliding sleeve, said recess having a greater dimension in axial direction than the effective range of said retaining means.

12. Disengaging member according to claim 1 wherein said retaining means is a snap ring.

13. Disengaging member according to claim 1 wherein said retaining means is a spring washer.

14. Disengaging member according to claim 10 wherein one of said bearing races overlaps said stop means for said nonrevolving bearing race, and said retaining means is received in a recess formed in said non-revolving race.

15. Disengaging member according to claim 10 wherein said retaining means comprises at least one cage-like member firmly connected to one of said bearing races, said cage-like member having at least a part thereof overlapping parts of said sliding sleeve.

16. Disengaging member according to claim 1 wherein said retaining means additionally limits play of said bearing in radial direction.

17. Disengagement unit, especially for motor trucks, including the disengaging member according to claim 1 wherein said revolving bearing race abuts the disengaging elements of the clutch even in engaged condition of the clutch.

18. Disengagement unit according to claim 17 including force-storing means for pressing the disengaging member against the disengaging elements of the clutch substantially over the possible path of wear of the clutch parts.

* * * * *